(12) United States Patent
Tratzky et al.

(10) Patent No.: US 8,097,341 B2
(45) Date of Patent: Jan. 17, 2012

(54) PROCESS FOR PRODUCING A WIPE-PROOF ANTIREFLECTION LAYER ON A BOROSILICATE GLASS BODY

(75) Inventors: Stephan Tratzky, Neustadt (DE); Denise Trapp, Mitterteich (DE)

(73) Assignee: Schott AG, Mainz (DE)

( * ) Notice: Subject to any disclaimer, the term of this patent is extended or adjusted under 35 U.S.C. 154(b) by 334 days.

(21) Appl. No.: 12/356,946

(22) Filed: Jan. 21, 2009

(65) Prior Publication Data

US 2009/0191413 A1 Jul. 30, 2009

(30) Foreign Application Priority Data

Jan. 30, 2008 (DE) .................. 10 2008 006 785

(51) Int. Cl.
*B32B 17/06* (2006.01)

(52) U.S. Cl. .......... 428/428; 428/426; 428/432; 501/55; 501/63; 501/65; 501/66; 501/67; 501/68; 501/69; 501/70; 501/72

(58) Field of Classification Search ........... 501/55, 501/63, 65, 66, 67, 68, 69, 70, 72; 428/426, 428/428, 432
See application file for complete search history.

(56) References Cited

U.S. PATENT DOCUMENTS

| | | | |
|---|---|---|---|
| 2,601,123 A | 6/1952 | Moulton | |
| 6,918,957 B2 * | 7/2005 | Kursawe et al. | 106/287.34 |
| 6,998,177 B2 | 2/2006 | Krzyzak et al. | |
| 2003/0059540 A1 * | 3/2003 | Berni et al. | 427/376.1 |
| 2004/0258929 A1 * | 12/2004 | Glaubitt et al. | 428/446 |

FOREIGN PATENT DOCUMENTS

EP 1 342 702 9/2003

OTHER PUBLICATIONS

International Standard ISO 9211-4, Optics and Optical Instruments—Optical Coatings, Part 4, Second Edition, May 1, 2006 (in Eng.).

* cited by examiner

*Primary Examiner* — Gwendolyn Blackwell
(74) *Attorney, Agent, or Firm* — Michael J. Striker

(57) ABSTRACT

A process for producing a wipe-proof anti-reflection layer on a borosilicate glass body is described, in which the borosilicate glass body is coated with a coating solution having a composition of 1-6% by weight of HCl, 0.5-7% by weight of $SiO_2$ sol (solids content), 0.5-5% by weight of $H_2O$, and 85-98% by weight of a readily volatile water-soluble organic solvent. The borosilicate glass body that is to be coated contains, in % by weight based on oxide content: 63-76 of $SiO_2$, >11-20 of $B_2O_3$, 1-9 of $Al_2O_3$, 3-12 of alkali metal oxide(s), 0-10 of alkaline earth metal oxide(s), 0-2 of ZnO, 0-5 of $TiO_2$, 0-1 of $ZrO_2$, 0-1 of $Nb_2O_5$, and 0-1 of $WO_3$.

8 Claims, No Drawings

PROCESS FOR PRODUCING A WIPE-PROOF ANTIREFLECTION LAYER ON A BOROSILICATE GLASS BODY

CROSS-REFERENCE

The invention described and claimed herein below is also described in German Patent Application 10 2008 006 785.7, which was filed on Jan. 30, 2008 in Germany. The aforesaid German Patent Application provides the basis for a claim of priority of invention for the invention claimed herein below under 35 U.S.C. 119(a)-(d).

BACKGROUND OF THE INVENTION

1. The Field of the Invention

The invention relates to a process for the production of a strongly adhering and wipe-proof, porous $SiO_2$-containing antireflection layer on a borosilicate glass body, i.e. a process for the coating of a borosilicate glass body with a strongly adhering and wipe-proof porous $SiO_2$-containing anti-reflection layer.

2. Description of the Related Art

It is known that porous $SiO_2$ layers adhere poorly to borosilicate glass bodies. This is true in particular of layers which have been produced with the use of a $SiO_2$ sol.

For improving the adhesion, it has already been proposed to add to the sol tetraethyl orthosilicate whose decomposition products bond the $SiO_2$ particles to one another and to the substrate (U.S. Pat. No. 2,601,123). However, these solutions are complicated to prepare and are relatively expensive.

EP 0 897 898 B1 discloses a process using a purely aqueous coating solution which contains $SiO_2$ sols and surfactants. In this process, it is absolutely essential that the substrate to be coated be pretreated with acetone, ethanol and water, a strongly alkaline cleaning solution (1N NaOH) or commercially available cleaning baths, it being necessary if appropriate to reinforce the cleaning effect by the use of ultrasound. Particularly the cleaning steps (see Example 1) make this process expensive.

EP 1 342 702 A1 or U.S. Pat. No. 6,998,177 B2 discloses a process which is advantageous in terms of process engineering and in which an alcohol-containing, nitric acid-stabilized suspension of a $SiO_2$ sol is used. The known poor adhesive strength and wipe resistance of the $SiO_2$ particle layer formed are avoided by adding $H_3PO_4$ to the coating liquid. The adhesive strength and wipe resistance of the antireflection layer thus produced is very good, but it has been found that such layers age in the course of a few weeks, which manifests itself in that the originally deep blue antireflection layers fade and become cloudy so that the desired high transmittance for incident light and the wipe resistance decline. This fading can be reversed by washing with water. It can be avoided if the glass bodies provided with the antireflection layers are washed with water after their production in the factory itself, with the result that the aging problem is eliminated in practice. However, this washing step means an undesired additional expense.

SUMMARY OF THE INVENTION

It is an object of the present invention to provide a coating process for producing a wipe-proof antireflection layer with a coating solution, which is just as easy to handle as the phosphorus-containing layer produced by the above-described prior art process, but which has no aging problems and which does not need to be washed after its production.

According to the invention, this object is achieved by a process in which the glass body, which is to be provided with an antireflection layer and contains, in % by weight based on oxide content, 63-76 of $SiO_2$, >11-20 of $B_2O_3$, 1-9 of $Al_2O_3$, 3-12 of one or more alkali metal oxides, 0-10 of one or more alkaline earth metal oxides, 0-2 of ZnO, 0-1 of $ZrO_2$, 0-5 of $TiO_2$, 0-1 of $Nb_2O_5$, and 0-1 of $WO_3$, is wetted with a coating solution which, based on the total weight of the solution, contains:

| | |
|---|---|
| 1.0 to 6 | % by weight of HCl, |
| 0.5 to 7 | % by weight of $SiO_2$ sol (solids content), |
| 0.5 to 5 | % by weight of water, and |
| 85 to 98 | % by weight of a readily volatile, water-soluble organic solvent. |

The HCl serves as an acid in a manner known per se for stabilizing the $SiO_2$ sol. The $SiO_2$ sol (silica sol) can be prepared by known methods, for example by treating an aqueous alkali metal silicate solution with ion exchangers. Silica sol is an aqueous solution of colloidal, amorphous $SiO_2$. The commercially available silica sols usually contain 30 to 60% by weight of $SiO_2$. The average particle diameter is 5 to 150 nm.

The $SiO_2$ content of the coating solution is preferably 0.5 to 5.0% by weight. The particle size of the $SiO_2$ in the coating solution should be from 5 to 50 nm, preferably 8 to 20 nm.

The content of water in the coating solution is 0.5 to 5% by weight. It originates as a rule from the silica sol, the acid and the solvents, which are not always anhydrous.

The remainder of the coating solution consists of a readily volatile, water-soluble organic solvent. The term 'readily volatile' is understood to mean that the solvent has a boiling point of 75 to 140° C., in particular of 75 to 85° C. Suitable water-soluble solvents are in particular polar solvents. Monohydric lower alcohols having 1 to 5 carbon atoms, e.g. methanol, ethanol, propanols, butanols and pentanols, are particularly suitable. Furthermore, water-soluble ketones having 3 to 5 carbon atoms are suitable, in particular acetone, methyl ethyl ketone, diethyl ketone. Methanol, ethanol, propanols, butanols, dimethyl ketone or mixtures thereof are preferred.

The preparation of the solution is effected as a rule by initially introducing the total amount or a part of the solvent, then adding the acid with stirring and thereafter the silica sol with stirring and adding any residual amount of solvent.

The wetting of the glass bodies with the coating solution can be effected in any desired manner, for example by rolling on with porous rolls (sponge rolls), by applying with small or large brushes, flooding, etc., preferably by spraying on and particularly preferably by immersion. During immersion, the glass bodies to be coated are immersed in the solution (at any desired speed provided that the bath liquid does not splash and no gas bubbles adhere to the immersed glass body) and drawn out again at a constant speed. Suitable drawing speeds are from 1 $mm \cdot s^{-1}$ up to about 100 $mm \cdot s^{-1}$. An attempt is made to work at as high a drawing speed as possible in order to achieve high productivity rates. The drawing rate depends on the evaporation rate of the solution and the viscosity of the solution, the characteristics of the apparatus, the temperature of the solution and of the atmosphere in the drawing region and can easily be optimized by any person skilled in the art with respect to the local circumstances. In practice, drawing speeds of 1 to 20 $mm \cdot s^{-1}$ have proved useful.

After the wetting of the glass body with the solution, the layer formed is dried and baked in a manner known per se. The drying can also be effected in one step with the baking process if it is ensured that no gas bubble formation takes place during the evaporation of the solution. The baking is effected in a customary manner, known per se to the person skilled in the art, at temperatures of about 350° C. (i.e. below the glass transition temperature $T_g$) to 750° C. (i.e. above the glass transition temperature Tg), in particular at temperatures of 470 to 490° C.

The time required for the baking depends on the characteristics of the apparatus and can be easily determined by a person skilled in the art. Preferably, baking times of about one hour are used below $T_g$. At temperatures above $T_g$, shorter baking times should be maintained since the deformability of the glass tube increases with increasing temperature, e.g. 15 min at 750° C.

The layer produced comprises at least 95% by weight, preferably at least 99% by weight, of $SiO_2$. It is very particularly preferred if the layer consists completely of $SiO_2$.

The layer has a porosity of about 10 to 60% of the layer volume. In this range, good antireflection properties, i.e. a good passage of light through the antireflection-coated glass body, are achieved.

The layer thickness produced by the process is between 50 nm and 500 nm for a good antireflection effect. If this layer thickness is not reached, preferably a further coating process may be required before the baking, it being necessary in each case to, prior to the further coating process, dry the preceding coating to such an extent that it is not dissolved in the second coating process. A layer thickness between 80 and 160 nm is preferred.

The pore diameter in the layer produced should preferably be 2 to 50 nm since a particularly good antireflective effect is achieved in the case of this pore size.

The process permits the production of antireflection layers on borosilicate glass having a high $B_2O_3$ content and moderate $SiO_2$ content.

The process permits in particular the production of antireflection layers on borosilicate glass which contains the following constituents (in % by weight based on oxides):

| | |
|---|---|
| $SiO_2$ | 65-76 |
| $B_2O_3$ | 12-19, preferably 15-19 |
| $Al_2O_3$ | 1-<5, preferably 1-4.5 |
| $Li_2O + Na_2O + K_2O$ | 3-12 |
| one or more alkaline earth metal oxides | 0-5 |
| ZnO | 0-2 |
| $TiO_2$ | 0.5-5 |

A particular cleaning step prior to the wetting, for example by spray coating or immersion of the glass bodies in the coating solution, is usually not required. Only if the glass bodies have become soiled during transport or storage must the dirt be removed again by a washing process.

The coating is particularly suitable for coating of borosilicate glass bodies of the above-mentioned compositions as a glass tube or small glass tube, in particular for the production of light bulbs, in particular of discharge lamps, in particular of miniaturized discharge lamps, so-called backlights for background lighting of displays.

The coating is particularly suitable for the coating of small tubes having external diameters of 2.0 to 5.0 mm and having wall thicknesses of up to 0.8 mm.

Antireflection layers which are aging-resistant even without aftertreatment and have outstanding resistance to wiping can be produced on borosilicate glass by means of the invention.

EXAMPLES

1. Preparation of the Coating Solutions

A) Prior art (Phosphate-Containing)
Analogously to U.S. Pat. No. 6,998,177 B2, in Example 1, a coating solution was produced as follows:

235.8 g of isopropanol were mixed with 600.0 g of 1N $HNO_3$ and stirred for 10 minutes. Thereafter, 104 g of 85% strength $H_3PO_4$ were added and stirring was effected again for 5 minutes. Thereafter, 640 g of silica sol (Köstrosol 0830A, 30% of $SiO_2$, manufacturer Chemiewerke Bad Köstriz) were added and stirring was effected for a further 5 minutes. This mixture was diluted with 2756 g of isopropanol and then left to stand for one day. The solution was then ready to use.

B) Prior Art (Phosphate-free)
Analogously to U.S. Pat. No. 6,998,177 B2, in Example 2, a phosphate-free coating solution was produced as follows:

A corresponding solution was produced by method A), with the following changes: no phosphoric acid was added and 649 g of silica sol were used.

C) According to the Invention:
A coating solution according to the invention was produced as follows:

216 g of 5N HCl were added to 235.8 g of isopropanol, the solution was stirred for 1 minute, 187 g of silica sol (Köstrosol 0830A) were then added, stirring was effected again for 1 minute, 3361 g of isopropanol were added to the mixture and stirring was effected for 5 minutes. The solution was then ready to use.

2. Coating Process

Glass tubes having the composition (in % by weight based on oxide) of 73 of $SiO_2$, 15.6 of $B_2O_3$, 1.2 of $Al_2O_3$, 3.6 of $Na_2O$, 1.3 of $K_2O$, 0.7 of CaO, 0.4 of MgO and 4.2 of $TiO_2$ (glass no. 1) and having an external diameter of 5.0 mm and a wall thickness of 0.5 mm and a length of 600 mm were immersed along their longitudinal axis 450 mm deep into the coating solution. The immersion speed was 10 mm·s$^{-1}$. After a dwell time of about 10 sec, the glass tube was drawn out of the coating solution at a speed of 1 mm·s$^{-1}$ in the case of solution A and at a speed of 3.8 mm·s$^{-1}$ in the case of solutions B and C. As a result of the drawing process, a wet film formed on the glass. The coated glass was treated in a heated chamber at a temperature of 490° C., i.e. 10° C. below the $T_g$ of the glass, for one hour.

For comparison, a glass tube comprising a borosilicate glass having the composition (in % by weight based on oxide) of 81 of $SiO_2$, 13 of $B_2O_3$, 2 of $Al_2O_3$, 3.5 of $Na_2O$ and 0.5 of $K_2O$ was coated (glass no. 2). The glass tube had an external diameter of 3.0 mm and a wall thickness of 0.7 mm.

3. Wiping Test

Since the wiping test according to DIN ISO 9211-4 is suitable only for planar glass samples, it was appropriately modified for testing the coated tubes.

A cotton cloth served as a wiping body. The cotton cloth was moved back and forth over the coating along the axis of the glass tube with as constant a contact pressure as possible for up to not more than 20 wiping strokes. The number of wiping strokes up to complete removal of the layer is a measure of the wipe resistance of the layer. >20 indicates that the layer was still intact after 20 wiping strokes.

The wiping test was carried out on glass tubes having a diameter of 5 mm immediately after the baking of the coating ("initially") and was repeated in a 5-day cycle up to the final test after 20 days on the same sample, in each case in a different position.

4. Aging Test

Furthermore, the coated tubes were stored in free air for up to 3 weeks. While visual clouding occurred in the case of Example 2 and visual clouding and fading of the colour of the antireflection layer occurred in the case of Example 1 and crystal-like efflorescence resulted in the case of Example 4 and Example 5, no fading, clouding or efflorescence at all occurred in the case of the glass bodies coated according to the invention (cf. Example 3).

5. Results

The results are summarized in Table I.

TABLE I

| | GLASS NO. | BAKING TEMPERATURE [° C.] | AGING RESISTANCE | WIPE RESISTANCE [STROKES] |
|---|---|---|---|---|
| Example 1 with phosphate (solution A) (prior art) | 1 | 490 | strongly faded after 3 weeks | initially > 20, after aging for 20 days > 20 |
| Example 2 phosphate-free (solution B) (prior art) | 1 | 490 | strongly faded after 3 weeks, point-like clouding after 3 weeks | initially 15, after aging for 20 days 1 |
| Example 3 (solution C) according to the invention | 1 | 490 | no fading | initially > 20, after aging for 20 days > 20 |
| Example 4 (solution A) | 2 | 490 | no fading, crystal-like efflorescence | initially 20, after aging for 10 days 5 |
| Example 5 (solution C) | 2 | | no fading, crystal-like efflorescence | initially 20, after aging for 10 days 8 |

The superiority of the process according to the invention is clear from these examples.

While the invention has been illustrated and described as embodied in a process for the production of a strongly adhering and wipe-proof, porous $SiO_2$-containing antireflection layer on a borosilicate glass body, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A coated glass body comprising a borosilicate glass body and a wipe-proof porous phosphorus-free $SiO_2$-containing antireflection layer on said borosilicate glass body, said borosilicate glass body having a composition, in weight percent on an oxide basis, comprising:

| | |
|---|---|
| $SiO_2$ | 63-76, |
| $B_2O_3$ | >11-20, |
| $Al_2O_3$ | 1-9, |
| at least one alkali metal oxide | 3-12, |
| at least one alkaline earth oxide | 0-10, |
| ZnO | 0-2, |
| $TiO_2$ | 0-5, |
| $ZrO_2$ | 0-1, |
| $Nb_2O_5$ | 0-1, |
| $WO_3$ | 0-1; | said coated glass body being produced by a process comprising the steps of:
a) providing said borosilicate glass body having said composition;
b) providing a coating solution containing

| | |
|---|---|
| 1.0 to 6.0 | percent by weight of HCl, |
| 0.5 to 7.0 | percent by weight of $SiO_2$ sol (solids content), |
| 0.5 to 5 | percent by weight of water, and |
| 85 to 98 | percent by weight of a readily volatile water-soluble organic solvent; | c) wetting said borosilicate glass body with said composition according to step a) with said coating solution according to step b); and
d) drying and baking said borosilicate glass body wet with said coating solution according to step c) to form the wipe-proof porous phosphorus-free $SiO_2$-containing antireflection layer.

2. The coated glass body as defined in claim 1, wherein the wetting of said borosilicate glass body comprises immersing said borosilicate glass body in said coating solution.

3. The coated glass body as defined in claim 2, wherein the process comprises removing said borosilicate glass body from said coating solution with a speed of 1 to 100 mm·s$^{-1}$ after the immersing.

4. A lamp bulb of a discharge lamp, said lamp bulb comprising said coated glass body according to claim 1.

5. The coated glass body as defined in claim 1, wherein said composition of said borosilicate glass body, in percent by weight on said oxide basis, comprises: 65-76 of said $SiO_2$; 15.6-19 of said $B_2O_3$; 1-<5 of said $Al_2O_3$; 3-12 of said at least one alkali metal oxide; 0-5 of said at least one alkaline earth metal oxide; 0-2 of said ZnO; and 0.5-5 of said $TiO_2$.

6. The coated glass body as defined in claim 1, wherein said antireflection layer comprises at least 99 wt. % of said $SiO_2$.

7. The coated glass body as defined in claim 6, wherein said antireflection layer has a layer thickness of from 50 nm to 500 nm and a porosity of 10 to 60% of a total volume of said layer.

8. The coated glass body as defined in claim 1, wherein said antireflection layer consists of said $SiO_2$ and has a layer thickness of from 50 nm to 500 nm and a porosity of 10 to 60% of a total volume of said layer.

* * * * *